Feb. 27, 1951 — T. S. BRISKIN — 2,543,486
PORTABLE POWER SAW
Filed June 8, 1945 — 7 Sheets-Sheet 1
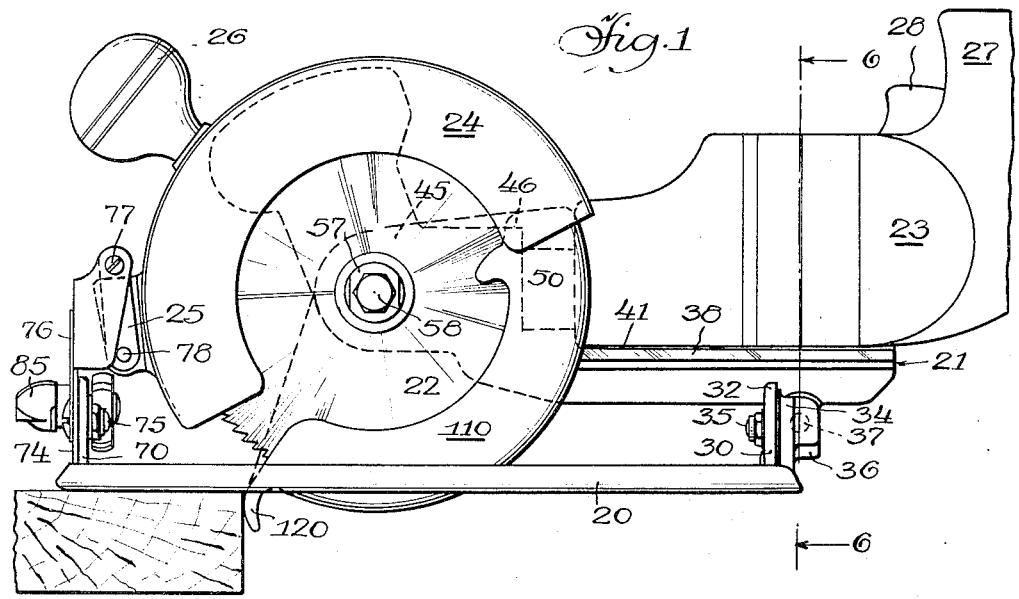
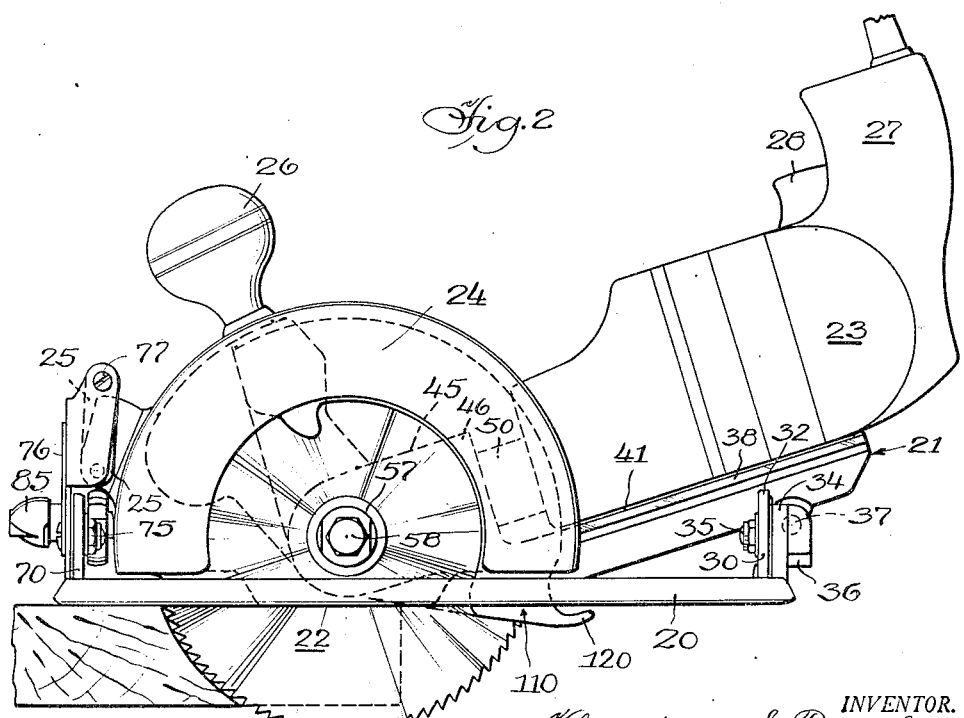
INVENTOR.
Theodore S. Briskin
BY Zabel and Gritzbaugh
Attys.

Feb. 27, 1951      T. S. BRISKIN      2,543,486
PORTABLE POWER SAW
Filed June 8, 1945      7 Sheets-Sheet 2
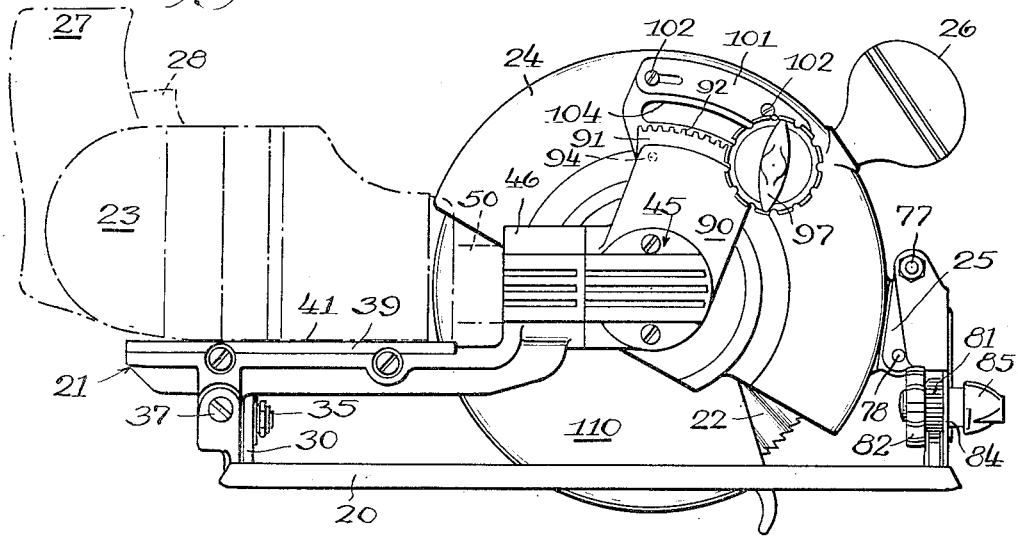
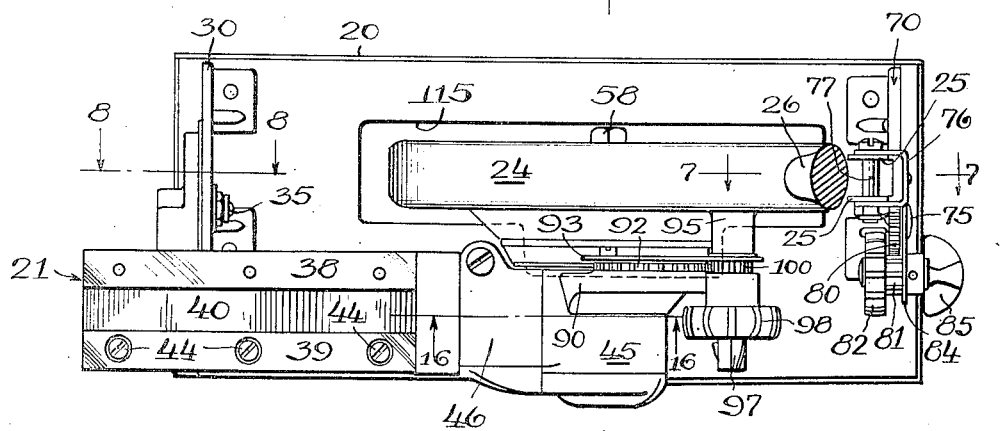
INVENTOR.
Theodore S. Briskin
BY
Zabel and Gritzbaugh
Attys Feb. 27, 1951 T. S. BRISKIN 2,543,486
PORTABLE POWER SAW
Filed June 8, 1945 7 Sheets-Sheet 3

INVENTOR.
Theodore S. Briskin
BY
Zabel and Gritzbaugh
Attys.

Feb. 27, 1951  T. S. BRISKIN  2,543,486
PORTABLE POWER SAW
Filed June 8, 1945  7 Sheets-Sheet 4
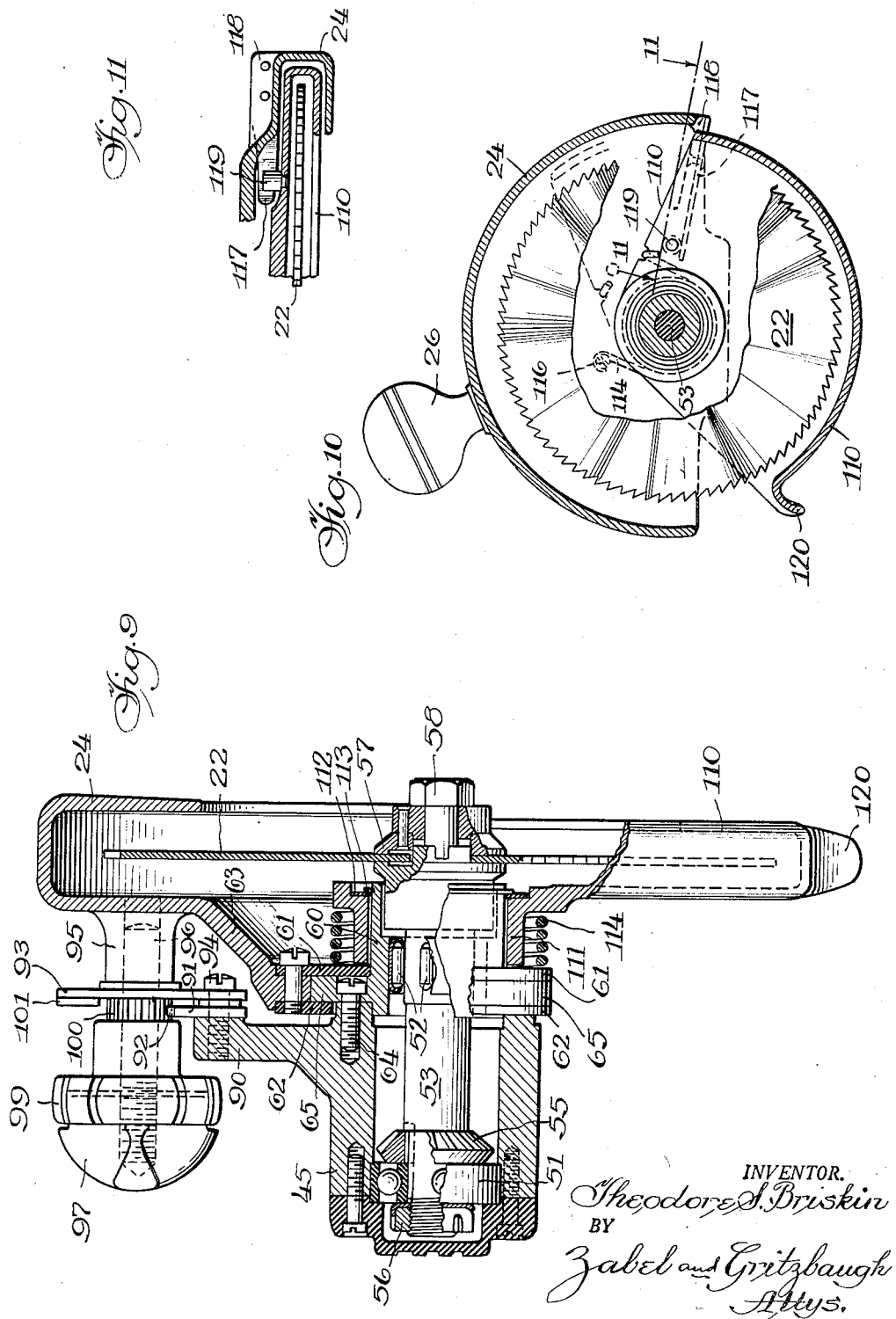
INVENTOR.
Theodore S. Briskin
BY
Zabel and Gritzbaugh
Attys.

Feb. 27, 1951 T. S. BRISKIN 2,543,486
PORTABLE POWER SAW
Filed June 8, 1945 7 Sheets-Sheet 5
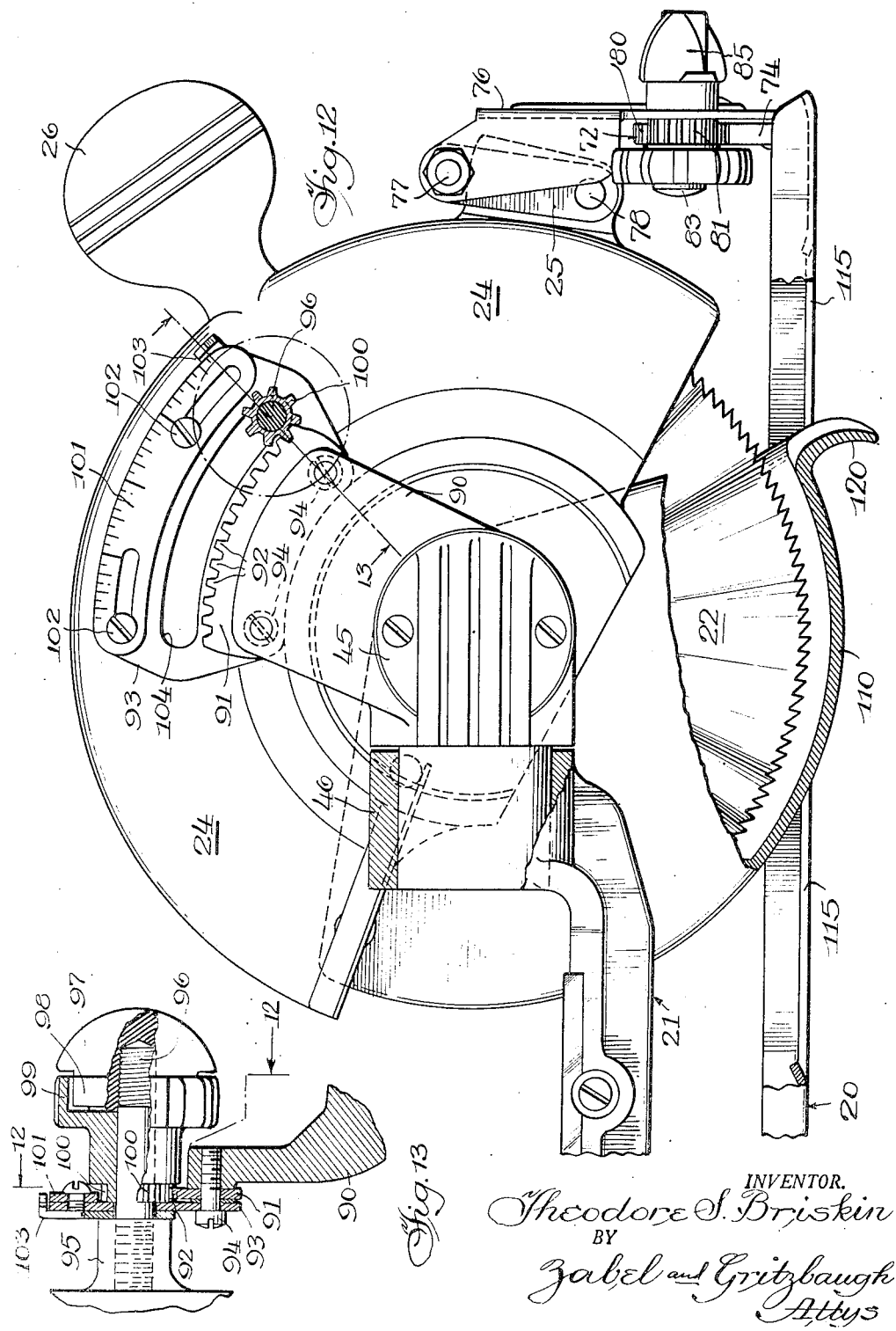
INVENTOR.
Theodore S. Briskin
BY
Zabel and Gritzbaugh
Attys

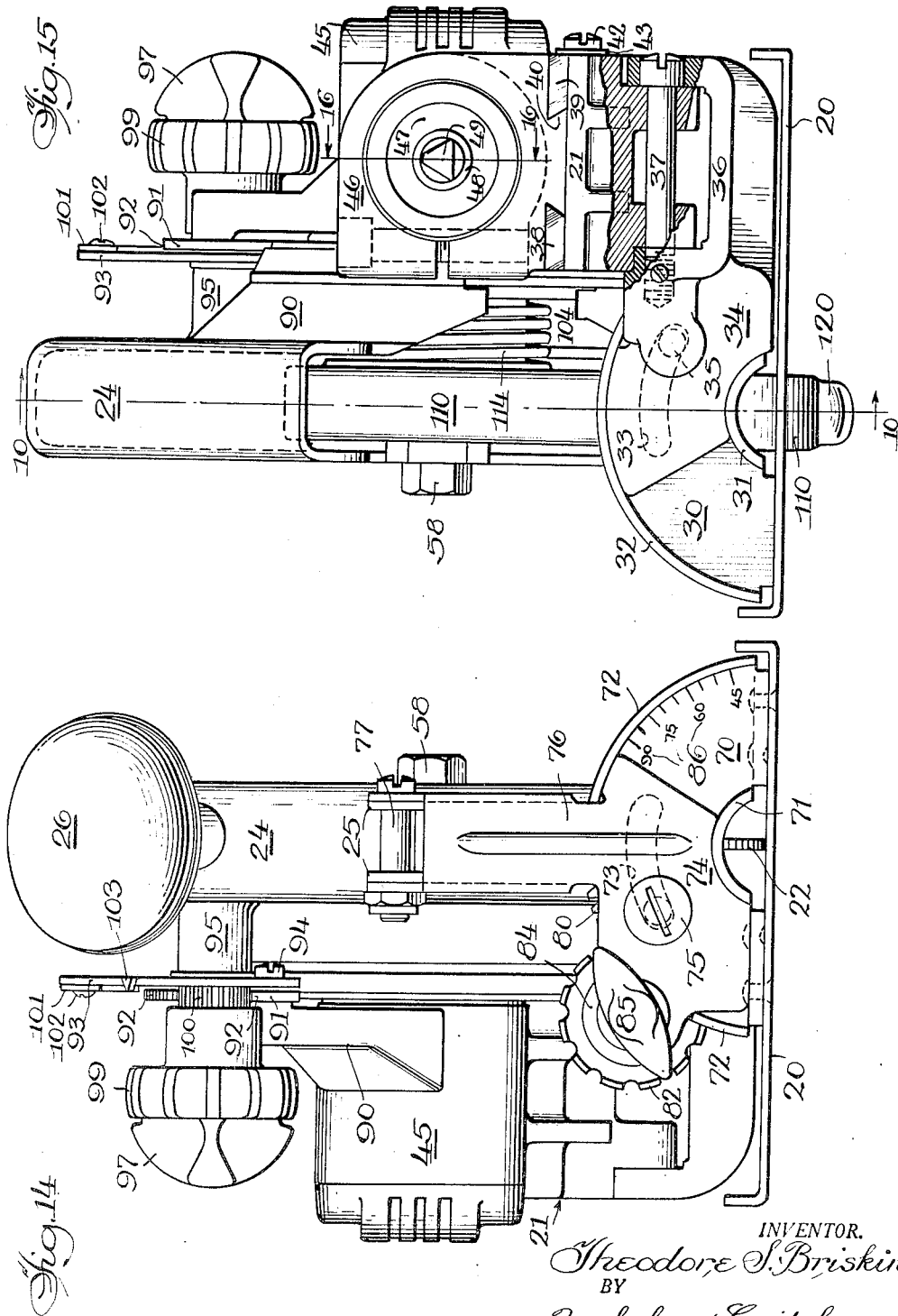

Feb. 27, 1951        T. S. BRISKIN        2,543,486
PORTABLE POWER SAW
Filed June 8, 1945             7 Sheets-Sheet 7
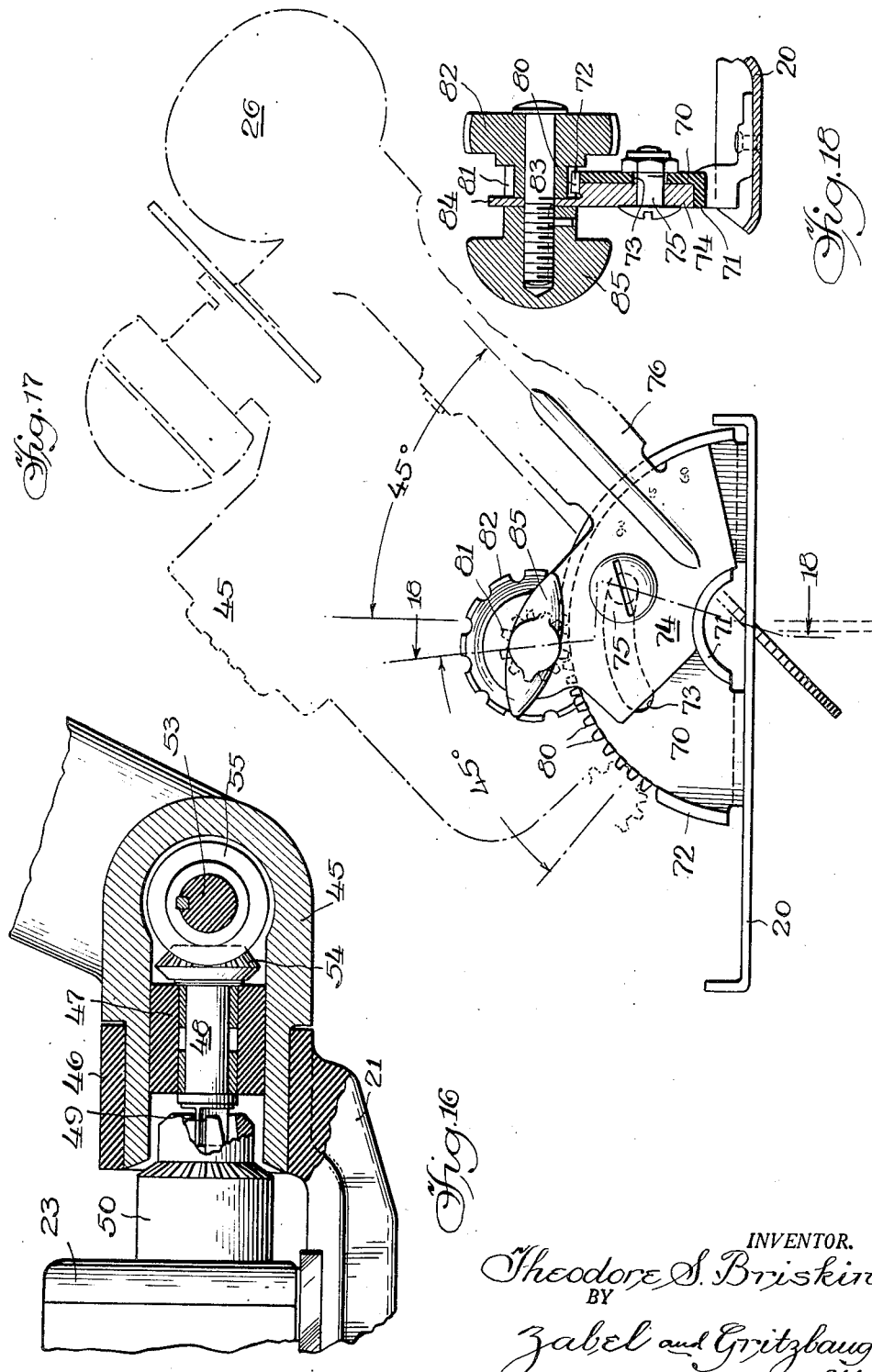
INVENTOR.
Theodore S. Briskin
BY
Zabel and Gritzbaugh
Attys Patented Feb. 27, 1951

2,543,486

UNITED STATES PATENT OFFICE 2,543,486

PORTABLE POWER SAW

Theodore S. Briskin, Chicago, Ill., assignor to Excel Auto Radiator Company, Chicago, Ill., a corporation of Delaware Application June 8, 1945, Serial No. 598,283

2 Claims. (Cl. 143—43)

This invention relates to improvements in portable power saws.

The particular embodiment of the invention herein shown and described comprises a tool unit in combination with a detachable power unit, the two being operatively associated with each other in the manner shown in my copending application Serial No. 589,205, filed April 19, 1945, issued October 25, 1949, as Patent No. 2,486,255. However, it is understood that the invention is not limited to this particular arrangement of parts.

One of the objects of this invention is to provide a power saw which is adjustably mounted on a work contacting base so that it can be tilted on a longitudinal axis to provide an angular cut, and so that it can also be adjusted to project through the base to a variable extent.

A further object is to provide an improved construction in which the longitudinal axis along which the saw is tilted, lies along the plane of the work contacting base so that the projection of the saw blade through the base, for a given setting of the projection adjusting mechanism, will be the same irrespective of the tilting along the longitudinal axis.

A still further object is to provide an improved adjusting mechanism whereby the projection of the saw through the base is accompanied by a comparatively small angular displacement of the parts of the tool which are grasped by the hand.

Another object is to provide an improved means for mounting the saw and the power unit with respect to the work contacting base, which means is in the form of a linkage which permits facile adjustment of the position of the parts.

Other objects are to provide an improved guard for the saw blade, improved clamping means by which the parts may be securely held in their adjusted positions, and improved means for associating the power unit with the operating parts of the saw itself.

Other objects, features and advantages will become apparent as the description proceeds.

With reference now to the drawings, in which like reference numerals designate like parts, Fig. 1 is a side elevation of a preferred embodiment of this invention;

Fig. 2 is a view similar to Fig. 1, but showing the parts in changed positions;

Fig. 3 is an elevation showing the opposite side of the saw from that shown in Figs. 1 and 2;

Fig. 4 is a top view;

Fig. 9 is a section taken along line 9—9 of Fig. 4;

Fig. 10 is a detail section taken along line 10—10 of Fig. 15, and showing the construction of the saw guard;

Fig. 11 is a detail taken along line 11—11 of Fig. 10;

Fig. 12 is an enlarged view, partially broken away to show the details of the clamping means;

Fig. 13 is a section taken along line 13—13 of Fig. 12;

Fig. 14 is a front end view;

Fig. 15 is a rear end view, partially broken away;

Fig. 16 is a section along line 16—16 of Figs. 4 and 15;

Fig. 17 is a detail of the clamping means which controls the tilting of the saw along the longitudinal axis of the tool; and Fig. 18 is a section along line 18—18 of Fig. 17.

Figure 5:
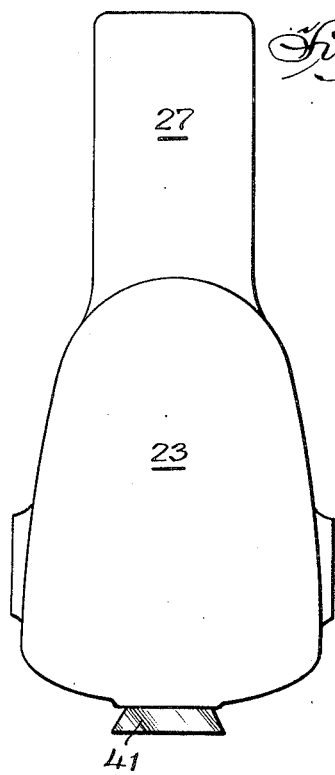
Fig. 5 is an end view of the power unit.

As shown in Figs. 1 and 2, the tool comprises a work contacting base 20, and a supporting frame 21 which is spaced therefrom and adjustably mounted with respect thereto. A circular saw blade 22 and a detachable power unit 23 are suitably supported by means of the frame 21. A saw guard 24 is also pivotally mounted on the frame 21, and is also supported at the front end of the tool by a link 25. The base 20, the frame 21, the guard 24, and the link 25 form a four member linkage, by means of which the projection of the saw blade 22 through the base 20 may be determined, as will be explained hereinafter.

The guard is provided with a knob 26, and the detachable power unit is provided with a handle 27, these two elements being the parts of the tool unit which are grasped by the hand of the operator in use. The detachable power unit is provided with with a switch which is actuated by a trigger 28, whereby the operation of the saw blade can be controlled.

Figure 6:
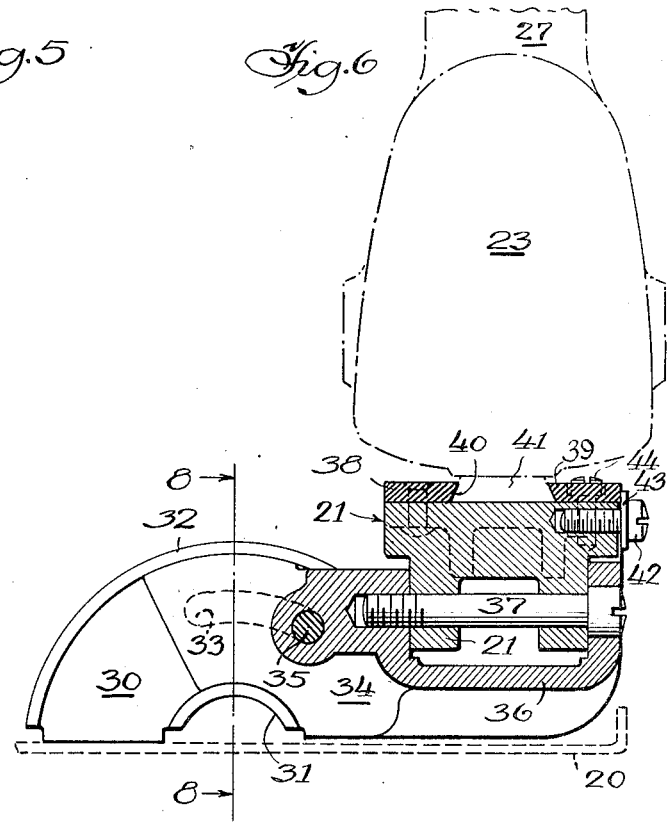
Fig. 6 is a section taken along line 6—6 of Fig. 1, showing in detail the manner in which the power unit is associated with the tool unit.
Figure 8:
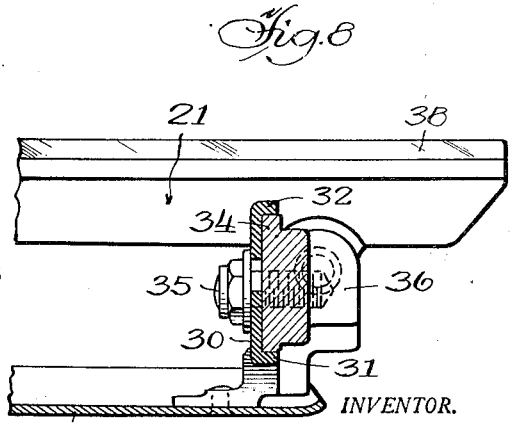
Fig. 8 is a view taken along line 8—8 of Figs. 4 and 6.

At the rear end of the base 20 is provided an upwardly extending semi-circular plate 30, as shown in Figs. 6 and 8. The plate is provided with inner and outer flanges 31 and 32, and with a slot 33. The slot and the flanges are arcuate shaped about a center which lies on the lower surface of the base 20. The flanges thus form an arcuate shaped recess in which a sector 34 is mounted. A bolt 35 extends through the slot 33 and takes into the sector 34, providing means for slidably mounting the sector with respect to the plate 30. A bracket 36 is formed integrally with the sector 34, and is recessed to accommodate the frame 21. A pivot bolt 37 extends through the bracket 36 and the frame 21 and provides a means by which the frame may be tilted along the lateral axis of the tool.

The means by which the power unit 23 is mounted on the frame 21 is shown in Fig. 6. The power unit 23 is provided with a dove tail tenon 41 which is received within a dove tail groove 40 which is formed by two undercut strips 38 and 39. The undercut strip 38 is suitably riveted to the frame 21. The undercut strip 39 is adjustably mounted on the frame by vertically disposed screws 44. The undercut strip 39 is slotted so as to provide for lateral movement of the strip, the screws 44 serving to confine the strip against the upper surface of the frame. Horizontally disposed screws 42 take into the body of the frame 21 and are provided with washers 43 which bear against the side edge of the undercut strip 39. Thus when the screws 42 are tightened up, the groove 40 is narrowed, causing a gripping of the dove tail tenon 41.

Forming a portion of the frame is a gear housing 45 which is received within a ring shaped member 46 which is cast integrally with the frame 21. See Figs. 12 and 16. A bearing 47 is disposed within the gear housing 45, and a drive shaft 48 is journaled in the bearing. The drive shaft terminates at one end in a tang 49, which is adapted to be received in the chuck 50 of the power unit 23.

The arrangement above described provides a convenient method of securely associating the power unit 23 with the tool unit. The tenon 41 is slid into the groove 40 until the chuck 50 engages the tang 49. Then the screws 42 are tightened up to provide what is for all practical purposes an integral unit. It is contemplated that the chuck 50 be not screwed up tightly; a loose engagement is desirable to compensate for any slight misalignment of the parts.

The gear housing 45 is provided with a bore which runs at right angles to the shaft 48, and accommodates the saw shaft 53, as shown in Fig. 9. The shaft 53 is journaled at one end in ball bearings 51, and at the other end in roller bearings 52. A bevel gear 55 is keyed to the shaft 53 and is driven from a bevel gear 54 keyed to shaft 48. A nut 56 is threaded on to the left end of shaft 53, as shown in Fig. 9, to maintain the shaft 53, the bevel gear 55, and the ball bearing unit 51 in proper relationship.

At the other end of the shaft is provided a hub 57 which provides suitable means for detachably mounting the saw blade 22. A nut 58 is provided for maintaining the hub in proper relationship to the shaft.

A flanged collar 60 is suitably bolted to the gear housing 45 by means of bolts 64 which extend through the flange 65. The collar 60 forms a raceway for the roller bearings 52. The saw guard 24 is provided with a bracket 63 to which are bolted annular plates 61 and 62, the plates being spaced from each other and embracing the flange 65. Thus the guard 24 is rotatably mounted with respect to the gear housing 45 and the support 21.

Figure 7:
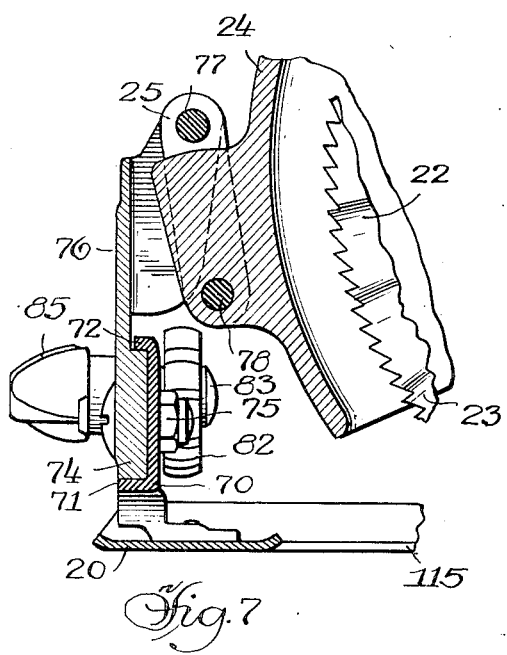
Fig. 7 is a view taken along line 7—7 of Fig. 4.

The guard 24 is also supported by the link 25, which, in turn is mounted on adjustable means similar to the adjustable means on which the bracket 36 is mounted. At the opposite end of the base 20 from the plate 30 is a similar plate 70, as shown in Figs. 7 and 17. The plate 70 is provided with semi-circular flanges 71 and 72, and an arcuate slot 73. A sector 74 is slidably mounted in the recess formed by the flanges 71 and 72. A bolt and nut 75 extends through the sector 74 and the slot 73, and serves to maintain the parts in operative relationship. A bracket 76 is carried by the sector 74, and at its upper end is shaped to provide a yoke in which the link pin 77 is mounted. The link 25, which also is of U-shaped cross section, depends from the link pin 77 and at its lower end is secured to the guard 24 by means of a link pin 78.

It will be seen therefore that the frame 21, including its supporting bracket 36, and the guard 24, including the link 25 and the supporting bracket 76, are adjustably mounted to rotate about the longitudinal axis of the tool. Means for adjusting the angle of tilt are provided, as shown in Figs. 17 and 18.

The flange 72 of the plate 70 is provided with teeth 80. A cooperating pinion 81 and a knob 82 integrally formed therewith, are keyed on to a bolt 83 which extends through a second bracket 84 on sector 74. A thumb nut 85 is provided for the bolt 83 and provides means by which the bolt may be drawn up to lock the pinion 81 and knob 82 in any desired angular position.

In operation, it will be seen that rotation of the knob and pinion will cause the main portion of the tool to be rotated with respect to the base 20. The position of the parts, after the tool has been rotated through 45 degrees from the vertical, is shown in Fig. 17. After the parts have been brought into the desired angular position, the thumb nut 85 is tightened up, thereby locking the parts in their adjusted position. Inasmuch as the mechanical advantage of the pinion 81 and the teeth 80 is of the order of 1 to 9, it will be seen that the clamping force exerted by the teeth 80 and its associated parts is much less than that which would be ordinarily required, if the clamping device were disposed, for instance, on the bolt 75. Suitable indicia 86, as shown in Fig. 14, are provided on plate 70, and cooperate with the edge of the sector 74 to indicate the angle of tilt of the saw blade.

A somewhat similar adjusting mechanism is provided to determine the angle between the frame 21 and the guard 24. As pointed out previously, the base 20, the link 25, the guard 24, and the frame 21, form the four links of a four element linkage. Thus if the angle between any two links is fixed, the position of the links will be fixed. This construction is utilized in determining the extent to which the saw blade 22 will project through the base 20. The guard 24 pivots about the axis of the saw shaft 53, and means are provided to lock the saw guard and the frame, including its associated supporting member, the gear housing 45, in any desired angular position.

The gear housing 45 is provided with a bracket 90 on which is carried an arcuate rack 91 having teeth 92, and a slotted plate 93. These parts are best shown in Figs. 9, 12, and 13. The rack 91 and the plate 93 are suitably secured to the bracket 90 by means of bolts 94. A boss 95 is provided on the guard 24, and a stud 96 is non rotatably positioned in the boss 95, and projects through the slot 104 in the plate 93. A thumb nut 97 is screwed on to the free end of the stud 96 and includes an integral disk 98, which bears against the recessed surface of a knob 99. A pinion 100 meshes with the rack 91 and is formed integrally with the knob 99, the knob and the pinion being rotatably mounted on the stud 96. It will be seen that as the thumb nut 97 is tightened up, the plate 93 will be clamped between the pinion 100 and the boss 95, and the knob and pinion will be confined between the thumb nut 97 and the plate 93 and boss 95. Thus the knob and pinion may be locked in any given angular position.

A slotted index plate 101 is adjustably mounted on the plate 93 by means of screws 102. A pointer 103 is carried by the boss 95, the pointer cooperating with the indicia to indicate the number of inches that the saw blade 22 projects through the base 20. As pointed out above, when the angular disposition of the guard 24 is changed with respect to the frame 21, as by rotating the knob 99, the pivot point between these two links, and consequently the saw shaft 53, will be raised or lowered with respect to the base 20. In order to compensate for the change in reading which would be effected by reduction in the diameter of the saw blade, as by sharpening, the index plate 101 can be shifted with respect to the plate 93, so as to give a true reading at all times.

An additional guard is provided to cover the portion of the blade 22 which projects through the base 20. This lower guard is designated by reference numeral 110, and it is pivotally mounted with respect to the guard 24, and is of somewhat smaller dimensions so that it may be received within the guard 24 when it is rotated back to expose the saw blade. As shown in Fig. 9, the lower guard 110 is mounted on a hub 111, the hub being journaled on the collar 60. The hub 111 is maintained in its proper axial position with respect to the hub 60 by means of a washer 112 and a split ring 113. A coiled spring 114 surrounds the hub 111, and as shown in Fig. 10, one end of the coiled spring is hooked over an edge of the lower guard 110 and the other end is hooked over a suitable pin 116, which may be mounted in plate 61. Thus the lower guard is urged in a clockwise direction, as shown in Fig. 10, but it may be rotated backwardly to expose the projecting portion of the saw blade. The base 20 is provided with a slot 115 of sufficient width to permit the lower guard 110 to be extended therethrough when the saw blade is lowered.

A leaf spring 117 is riveted to a lug 118 formed on the guard 24, as shown in Fig. 11. A pin 119 is carried on the lower guard 110, the pin and the leaf spring cooperating to absorb the shock when the lower guard is released from its tensioned position, and escapes back into its extended position as shown in Fig. 10.

The lower guard is provided with a work contacting projection 120, which normally projects through the base even when the saw blade 22 is in its elevated position, as shown in Figs. 1 and 12. When the saw is brought up against a piece of wood, as shown in Figs. 1 and 2, the projection 120 will engage the work and be displaced backwardly as the saw cuts into the wood. Eventually the projection 120 and the lower guard 110 will be wholly received within the guard 24 so that the base 20 may rest squarely on the work.

The operation of the device has been described in detail in connection with the description of the various parts thereof.

The tool is manipulated by grasping the handle 27 of the power unit in one hand, and the knob 26 in the other hand. Pressure on the trigger 28 will cause the saw blade to be rotated, and as the saw is brought up against the edge of a piece of wood, the lower guard 110 will be automatically displaced to permit the saw blade to cut into the wood. The depth of the cut is regulated by means of knob 99 and thumb screw 97, whereas the angle of tilt of the saw blade is regulated by knob 82 and a thumb nut 85. Due to the fact that the axis of tilting lies in the plane of the lower surface of the base 20, the extent of projection of the saw blade through the base will be the same for any angle of tilting.

The clamping means provided by the knob 99 and thumb screw 97, and the knob 82 and thumb nut 85 permit an efficient screw clamping of the parts in their adjusted positions.

In adjusting the depth of the cut, both the knob 26 and the handle 28 rotate through comparatively short distances, as contrasted with the usual construction in which the guard and the frame do not comprise separate links. Furthermore, I am enabled to attain a greater variation in the distance through which the saw blade can be projected through the base.

Although I have shown only a preferred embodiment of my invention, it will be understood that various modifications and changes may be made without departing from the spirit thereof. The invention is to be limited only by the appended claims.

I claim:

1. A portable power saw comprising a slotted work contacting base, a frame pivotally mounted thereon about a lateral axis, a saw shaft journaled in said frame, a circular saw blade secured to said shaft, means for rotating said shaft, a guard pivotally mounted on said frame concentrically with said saw shaft, a link connecting said guard and said base, and means to adjust the angular disposition between said frame and said guard to determine the distance between said saw shaft and said base, said means comprising a slotted plate carried by said frame, a stud carried by said guard and projecting through said slotted plate, a rack carried by said frame, a pinion rotatably mounted on said stud and meshing with said rack and a nut to clamp said pinion between said plate and said nut in order to lock said pinion in a predetermined angular position.

2. A portable power saw comprising a slotted work contacting base, plates mounted at either end thereof and provided with semi-circular recesses, sectors slidably mounted in said recesses, an arcuate rack associated with one of said plates, a pinion associated with the corresponding sector and meshing with said rack, means to clamp said pinion to lock the position of said sector with respect to said plate whereby said frame will be maintained in a predetermined angular position with respect to said base, a supporting frame pivotally mounted on one of said sectors, a link pivotally mounted on the other of said sectors, a circular saw journaled in said frame, a power unit for said saw mounted on said frame, and a guard for said saw pivotally mounted on said frame and said link.

THEODORE S. BRISKIN.

REFERENCES CITED

The following references are of record in the file of this patent:

UNITED STATES PATENTS

| Number | Name | Date |
|---|---|---|
| 1,102,018 | Dodds | June 30, 1914 |
| 1,623,290 | Wappat | Apr. 5, 1927 |
| 1,671,201 | Michock | May 29, 1928 |
| 1,792,204 | Wallace et al. | Feb. 10, 1931 |
| 1,830,350 | Crowe | Nov. 3, 1931 |
| 1,830,579 | Wappat | Nov. 3, 1931 |
| 1,830,580 | Wappat | Nov. 3, 1931 |
| 1,848,330 | Emmons | Mar. 8, 1932 |
| 1,854,510 | Haas | Apr. 19, 1932 |
| 1,858,459 | Ramey | May 17, 1832 |
| 1,900,553 | Hampton | Mar. 7, 1933 |
| 2,168,282 | Tautz | Aug. 1, 1939 |